US 6,684,005 B1

(12) United States Patent
Egnell et al.

(10) Patent No.: US 6,684,005 B1
(45) Date of Patent: Jan. 27, 2004

(54) CONNECTION OF AN ADD/DROP NODE

(75) Inventors: Lars Egnell, Hagersten (SE); Bengt Johansson, Stockholm (SE); Fredrik Linden, Hagersten (SE); Fredrik Lindgren, Stockholm (SE); Dag Bonnedal, Enskede (SE); Ola Hulten, Hagersten (SE)

(73) Assignee: Cisco Systems (Sweden) Aktiebolag, Stockholm (SE)

( * ) Notice: Subject to any disclaimer, the term of this patent is extended or adjusted under 35 U.S.C. 154(b) by 0 days.

(21) Appl. No.: 09/631,102

(22) Filed: Aug. 1, 2000

(30) Foreign Application Priority Data

Sep. 27, 1999 (SE) .............................................. 9903521

(51) Int. Cl.$^7$ ............................. G02B 6/28; H04J 14/02
(52) U.S. Cl. ......................................... 385/24; 398/115
(58) Field of Search .................. 385/24, 147; 359/124, 359/128, 139; 398/115, 116, 117, 119, 130

(56) References Cited

U.S. PATENT DOCUMENTS

| | | | |
|---|---|---|---|
| 5,680,235 A | 10/1997 | Johansson | 359/110 |
| 5,754,545 A | 5/1998 | Shinbashi et al. | 370/360 |
| 5,774,606 A | 6/1998 | de Barros et al. | 385/24 |
| 5,953,141 A | 9/1999 | Liu et al. | 359/124 |
| 5,982,791 A | * 11/1999 | Sorin et al. | 359/247 |
| 6,160,616 A | * 12/2000 | Ohtomo et al. | 356/247 |
| 6,163,392 A | * 12/2000 | Condict et al. | 359/118 |
| 6,169,616 B1 | * 1/2001 | Cao | 350/130 |
| 6,333,799 B1 | * 12/2001 | Bala et al. | 359/117 |

FOREIGN PATENT DOCUMENTS

| | | | |
|---|---|---|---|
| EP | 0920 153 A2 | 6/1999 | ............ H04J/14/02 |
| WO | WO 98/26531 | 6/1998 | ............ H04J/3/06 |
| WO | WO99/65165 | 12/1999 | ......... H04B/10/213 |
| WO | WO01-24432 A1 | * 4/2001 | .................. 385/24 |
| WO | WO-01/24432 A1 | * 4/2001 | .................. 385/24 |

OTHER PUBLICATIONS

"New bi–directional WMD ring networkss with dual hub nodes". In Global Telcommunications Conference, 1997. GLOBECOM'97,IEEE, vol. 1, Nov. 3–8, 1997, pp. 556–560 by Zhong, Wen De.*

Zhao, Y. et al. "A novel bi–directional add/drop module for single fiber bi–directional self–healing wavelength division multiplexed ring networks." In: Optical Fiber Communications Conference, 1999. vol. 1, Feb. 21–26, 1999, pp. 183–185.

Ho, Keang–Po et al. "Eight–channel bidirectional WMD add/drop multiplexer." In: Electronics Letters. vol. 34 Issue 10, May 14, 1998, pp. 947–948.

Zhong, Wen De "New bi–directional WMD ring networks with dual hub nodes." In: Global Telecommunications Conference, 1997. GLOBECOM '97, IEEE. vol. 1, Nov. 3–8, 1997, pp. 556–560.

* cited by examiner

Primary Examiner—Akm Enayet Ullah
(74) Attorney, Agent, or Firm—Ritter, Lang & Kaplan LLP

(57) ABSTRACT

An add/drop node used in an optical network having two fiber paths for carrying light corresponding to a plurality of channels in opposite directions may include a pair of add/drop modules that correspond to one of the plurality of channels. This arrangement advantageously provides a simple approach for connecting the components of an add/drop node.

6 Claims, 5 Drawing Sheets

CONNECTION OF AN ADD/DROP NODE

CROSS-REFERENCE TO RELATED APPLICATIONS

This application is related to and claims benefit of priority to Swedish Patent Application No. 9903521-4, filed Sep. 27, 1999, entitled "CONNECTION OF AN ADD/DROP NODE," which is incorporated herein by reference in its entirety.

BACKGROUND OF THE INVENTION

1. Field of the Invention

The present invention relates to an optical communication system, in particular to an add/drop node of an optical WDM (Wavelength Division Multiplexing) network.

2. Discussion of the Background

Optical networks using WDM (Wavelength Division Multiplexing) technology are become more and more prevalent. These networks utilize a number of add/drop nodes that are interconnected; as the number of nodes increases, the complexity of the connections also increases. A simple approach is needed to connect these add/drop nodes to the network. In addition, upgrades to the add/drop nodes should likewise be simple. For example, when the capabilities of an existing add/drop node is expanded to operate at another wavelength band, the work that is required to upgrade the add/drop node should be minimized.

SUMMARY OF THE INVENTION

It is an object of the invention to provide an add/drop node for an optical WDM-network that has a simple mechanism to connect the node to the circulating fiber paths of the network.

According to one aspect of the invention, an add/drop node used in an optical network having two fiber paths for carrying light corresponding to a plurality of channels in opposite directions comprises a pair of add/drop modules that correspond to one of the plurality of channels. Each of the add/drop modules includes an add device that is configured to add light to one of the fiber paths, and a drop device configured to deflect a portion of the light from another one of the fibers paths. The pair of add/drop modules have identical construction. The above arrangement advantageously provides a simple approach for connecting the components of an add/drop node.

According to another aspect of the invention, an optical communication system comprises a plurality of fiber paths that carry optical signals corresponding to a plurality of channels in opposite directions. A plurality of add/drop nodes are coupled to the fiber paths. Each of the add/drop nodes includes a pair of add/drop modules that corresponds to one of the plurality of channels. Further, each of the add/drop modules includes an add device that is configured to add light to one of the fiber paths, and a drop device that is configured to deflect a portion of the light from another one of the fibers paths. The pair of add/drop modules have identical construction. The above approach simplifies scaling of the add/drop node.

According to yet another aspect of the invention, an add/drop node used in an optical network having two fiber paths for carrying light corresponding to a plurality of channels in opposite directions comprises a pair of add/drop modules that correspond to one of the plurality of channels. Each of the add/drop modules includes a means for adding light to one of the fiber paths, and a means for deflecting a portion of the light from another one of the fibers paths. The pair of add/drop modules have identical construction. The above arrangement advantageously permits ease of expanding the capabilities of the add/drop node.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
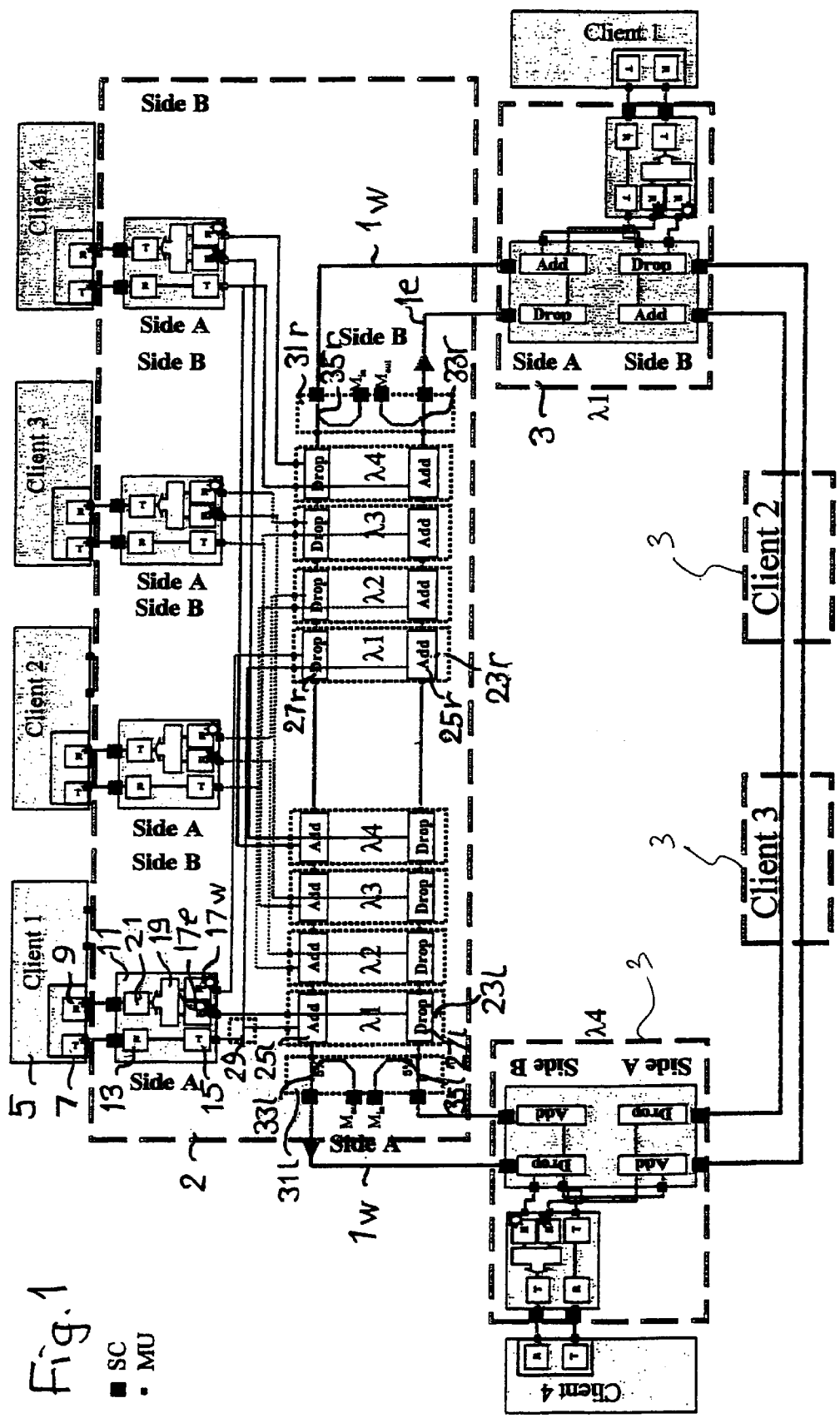
FIG. 1 is a block diagram of an optical network with a ring architecture providing connectivity among a hub node and four client nodes, in accordance with an embodiment of the present invention.

Referring now to the drawings, wherein like reference numerals designate identical or corresponding parts throughout the several views, and more particularly to FIG. 1 thereof, a block diagram of an optical fiber WDM-network having a ring configuration is shown. Two optical fiber paths 1e, 1w form the ring configuration, whereby one fiber path 1e carries light propagating in the east direction and the other fiber path 1w carries light propagating in the west direction.

In an exemplary embodiment, network 100 includes a hub node 2 and four client nodes 3 (i.e., Client 1, 2, 3 and 4). The nodes 3 are connected to the fiber paths 1e, 1w to add and drop light from the fibers 1e, 1w. Although four client nodes 3 are shown, a generalization to n client nodes can be made, where n=1, 2, . . . An nth Client node 3 receives and transmits information in a narrow wavelength band (also referred to as a channel) around a single wavelength $\lambda_n$. In this example, the hub node 2 can receive and transmit information from all channels—i.e., over all wavelengths $\lambda_n$, n=1, 2, . . . For each client node 3, the hub node 2 is connected to an electrical client portion 5. The electrical client portion 5 includes a transmitter 7 that converts electrical signals to optical signals and a receiver 9 that converts the optical signals to electrical signals. The electrical client portion 5 couples to an optical client portion 11 in the hub node 2.

The optical client portion 11 has optical connectors for receiving the optical fibers extending from the respective electrical client portion. The optical client portion 11 also contains an optical receiver-transmitter combination 13, 15 for transmission of light signals. The receiver 13 receives the light signal from the transmitter 7 of the electrical client portion 5, and outputs to the corresponding transmitter 15, which provides a well-defined light signal in the narrow wavelength band used for the respective client. In turn, the optical transmitter 15 outputs to an optical fiber via an optical connector; the optical fiber connects to add/drop modules 23*l*, 23*r*.

Furthermore, the optical client portion 11 includes an optical receiver-transmitter combination 21, 17*e*, and 17*w*; the combination 21, 17*e*, and 17*w* employs two optical receivers 17*e*, 17*w* that are connected to receive light from the add/drop modules 23*l*, 23*r* through optical fibers and optical connectors. One receiver 17*e* is used to receive light propagating in the network, in the appropriate fiber, in an east direction. Another receiver 17*w* receives light propagating in the west direction of the ring network. The outputs of the two optical receivers 17*e*, 17*w* are connected to inputs of a combining element 19, which combines the received signals and provides the composite signal to a transmitter 21. The output terminal of transmitter 21 is connected to the receiver 9 in the electrical client portion 5 through a respective connector and fiber, as shown.

Hub node 2 includes a number of add/drop modules 23*i*, 23*r*. One pair of such add/drop modules 23*l*, 23*r* is provided for each client node 3 in the network 100, in which one add/drop module 23*l* receives and transmits light signals in the leftward direction from the hub node 2. The other module 23*r* receives and transmits in the rightward direction from the hub node 2. Each add/drop module 23*l*, 23*r* is connected in the two ring-shaped fiber paths 1*e*, 1*w* of the network. The left add/drop module 23*l* has an add device 25*l* that is connected to the fiber ring path 1*w* and a drop device 27*l* that is connected to the other fiber ring path 1*e*.

The add device 25*l* is connected to the transmitter 15 in the optical client portion 1 of the corresponding client node, which in this case is client 1, through fiber pieces, a 50/50 splitting coupler 29 and a respective connector. The drop device 27*l* is connected to the receiver 17*e* in the optical client portion 11 for the same client node (i.e., Client 1) through a fiber and a respective connector.

Similarly, the right add/drop module 23*r* in the pair includes an add device 25*r* that is connected to the fiber ring path 1*e* and a drop device 27*r* that is connected to the other fiber ring path 1*w*. The add device 25*r* is connected to the transmitter 15 in the optical client portion 11 for the client node (Client 1) through fiber pieces, the splitting coupler 29 and the respective connector. The drop device 27*r* is connected to the receiver 17*w* in the optical client portion 11 for the client node through a fiber and the respective connector.

The add devices 25*l*, 25*r* contain some coupling or combining element (not shown) and, if required, a notch filter (not shown) that blocks light of the wavelength band or channel for which the add/drop module is designed. This optional notch filter filters out the light of the corresponding wavelength band before the light of the same wavelength band is added in the combining element. Likewise, the drop devices 27*l*, 27*r* possess some splitting and filtering elements for tapping off only the light of the wavelength band or channel for which the add/drop module is designed.

Because the add/drop modules 23*i*, 23*r* are similar in design and functionality, they can have identical physical configurations.

The two fiber ring paths 1*e*, 1*w* are connected to the left and right sides of hub node 2. At each such side, monitor modules 31*l*, 31*r* are interposed between the respective add/drop modules 23*i*, 23*r*, and the fibers 1*e* and 1*w*, thereby permitting monitoring of the signals outputted from the hub node 2. Each of the monitor modules 31*l*, 31*r* includes an add coupler 33*l*, 33*r* that adds, for example, some control signal and a tap 35*l*, 35*r* for tapping off some small portion of the incoming light power (e.g., 1%).

Figure 2:
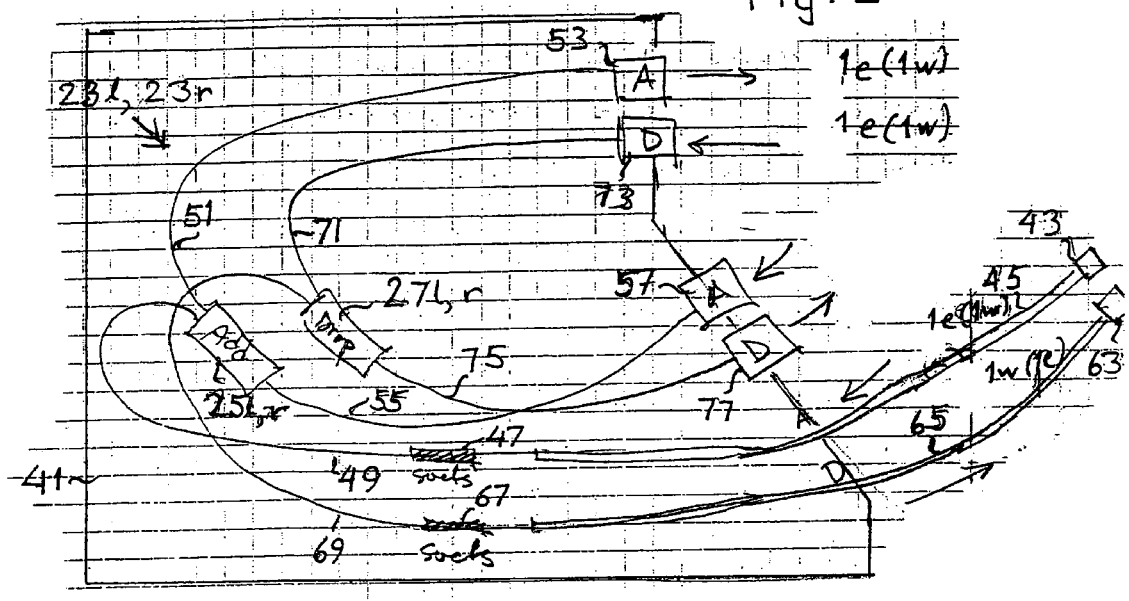
FIG. 2 is a schematic diagram of the connection lines of an add/drop module used in the add/drop nodes of the network of FIG. 1.

The schematic diagram of FIG. 2 illustrates to connections of the add/drop modules 23*i*, 23*r*. That is, the connections of FIG. 2 pertain to add/drop modules 23*i*, 23*r*; however, for explanatory purposes, the components of add/drop module 23*l* are described. The module 23*l* includes a housing 41 which contains the add device 25*l* and the drop device 27*l*. Light from fiber 1*e* of the two ring paths 1*e*, 1*w* of the network 100 enters the module 23*l* at a connector 43 that is attached to a fiber piece 45 extending loosely outside the housing 41. The fiber piece 45 has a thick protective sleeve that continues within the housing up through a weld section 47, which splices an end of an optical fiber 49 that has a standard thin protective sleeve to the fiber piece 45. The other end of the optical fiber piece 49 is connected to an input of the add device 25*l*. The output of the add device 25*l* is connected to a fiber piece 51, which in turn is connected on the same ring path 1*e* as the input connector 43. The other input of the add device 25*l* is connected to a connector 57 that is attached to the housing 41 through a fiber piece 55.

The connector 43 thus receives light from the ring path 1*e*; the light is carried on fiber 45 through the weld section 47, the fiber piece 55, the add device 25*l*, and the fiber piece 51 to the connector 53. The output connector 53 enables the light to continue along the ring path 1*e*.

Light from an optical client portion 11 enters the module 23*l* at the connector 57, and travels through the fiber to the add device 25*l*, which adds the light to the ring path 1*e*. In the module 23*i*, a set of connected fiber pieces, which is parallel to that described and is connected in the other ring path 1*w* of the network but in which instead of the add device 25*l* the drop device 27*l* is connected. Accordingly, a connector 63 is connected to the ring path and is attached to an end of a well protected fiber piece 65 that extends partly outside the housing 41. The other end of the fiber piece 65 is connected to a standard fiber piece 69 through a weld section 67. Fiber piece 69 is in turn connected to one of the two outputs of the drop device 27*l*. The input of the drop device 27*l* is connected to fiber piece 71, which receives light from a connector 73 that is attached to the housing 41. The connector 73 is connected in the respective ring path 1*w*. The other output of the drop device 27*l* is connected to an end of a fiber piece 75, which has the other end connected to connector 77. Connector 77 is attached to the housing 41 and is coupled to a receiver 17*w* in the optical client portion 11 Light from the ring path 1*w* enters the module 23*l* at the connector 73 and travels through fiber 71 to the drop device 27*l*, which passes the light to fiber 69 and then the weld 67. Thereafter, the thick fiber 65 carries the light to the loose connector 63, which in turn is connected in the ring path 1*w* of the network 100. Light of a specific wavelength band is tapped off in the drop device 27*l* and continues through the fiber 75 to the connector 77. The connector 77 then carries the light to the optical client portion 11.

The connections within housing 41 of add/drop module 23*l* are configured in the same manner for the right add/drop module 23*r*. Accordingly, for clarity, FIG. 2 shows the add device as 25*l, r* and the drop device 27*l, r* to convey the fact that the configuration of the housing 41 pertains to both add/drop modules 23*i*, 23*r*. The physical layout of the interior of an add/drop module housing 41 is shown in FIG. 3.

Figure 3:
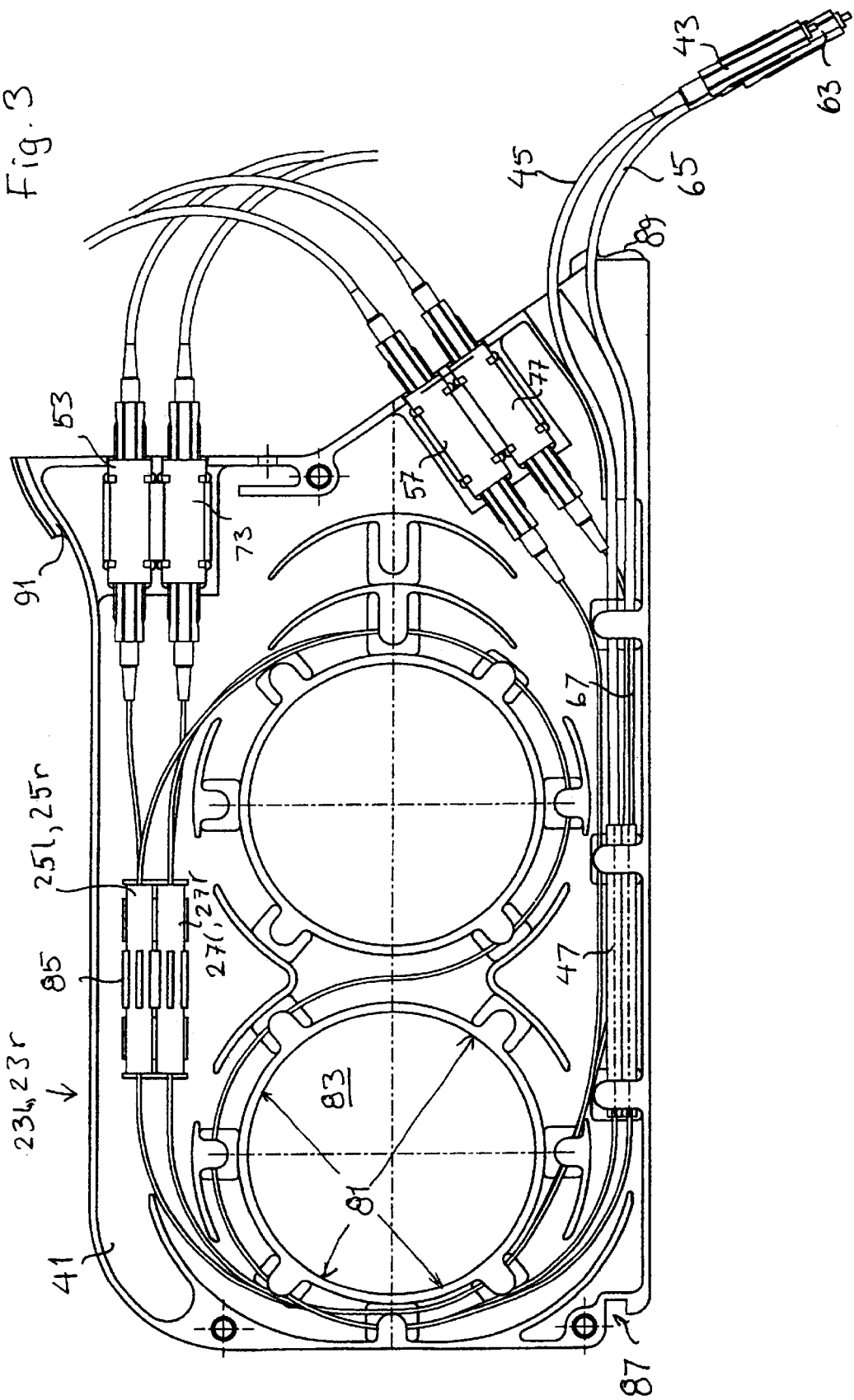
FIG. 3 is a view from the side of the inside of a housing of an add/drop module, according to an embodiment of the present invention.

FIG. 3 shows a side view of the inside of the housing of the add/drop module. The module housing 41 has a substantially flat portion from which various wads stand out. The wads all have the same height and connect to an essentially flat lid (not shown), which is mounted over the housing 41. The walls form two circular winding cores 81 with sufficiently large diameters, e.g., about 50 mm, to allow the fibers to be wound around them, as to not be subjected to bending radii that are too small (i.e., curvatures that are too large). The two winding cores are placed at some distance of each other to permit the fibers to pass therebetween.

By arranging the two cores in this manner, the fiber pieces can be comfortably handled, so that the fibers can be spliced to the devices in the case of fiber breaks or bad splices. In addition, the direction of the fiber pieces at the points where they are connected to the devices can be selected to not have bends that are too small; for instance, the fibers can be placed in a figure eight configuration around the two cores. Inside the wads that form the winding cores, through-holes 83 may be arranged to permit easy handling of the module. The add devices 25l, 25r and the drop devices 27l, 27r can be attached between outstanding wads 85 at the top of the housing 41.

Attaching devices are provided at the lower edge of the housing devices to attach the housing 41 to a rack. The attaching devices include a notch 87 at the rear side and a snap device 89 at the front side. A channel 91 is formed at the front top side to allow fibers that connect the module to the associated optical client portion 11 to be held therein.

Figure 4:
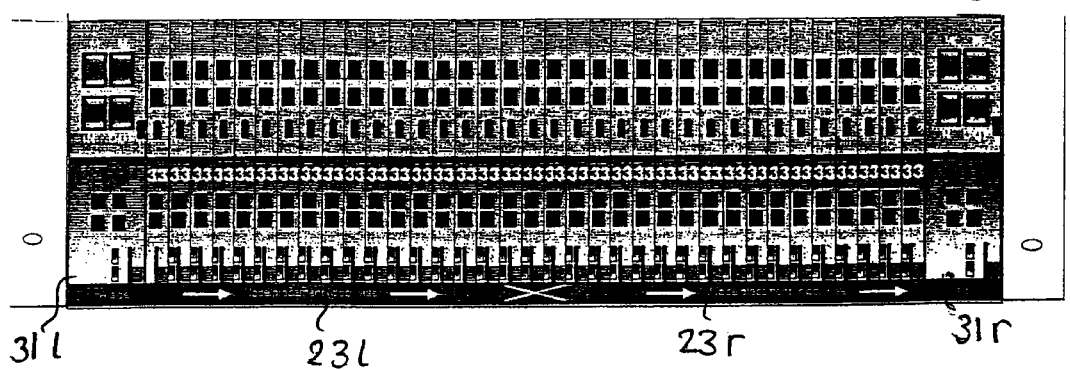
FIG. 4 is a front view of a rack with a number of add/drop modules mounted thereon, according to an embodiment of the present invention.

FIG. 4 shows a front view of the add/drop modules and the monitor modules mounted in a rack. The loosely extending fiber pieces 45, 65 (FIG. 2) are not shown in this figure. Comparing FIG. 4 to FIG. 1, it is seen that the connection of all left add/drop modules is as indicated in FIG. 3, in which the extending fiber pieces 45 are inserted in the mating connectors 53, 73 in an adjacent module at the left side. This connection is illustrated in the schematic view of FIG. 6 (as well as FIG. 5).

Figure 5:
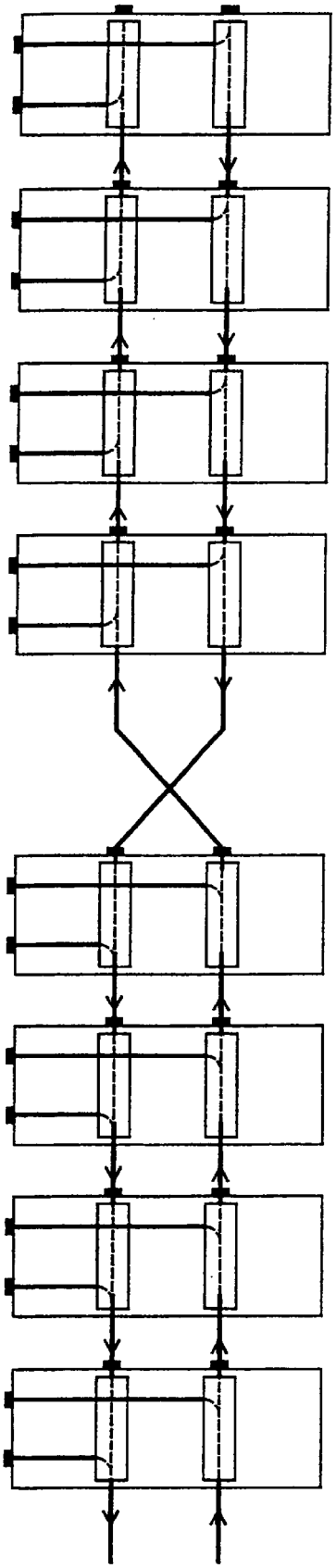
FIG. 5 is a block diagram of the connections of the add/drop modules within the add/drop nodes, according to an embodiment of the present invention.

In FIG. 5, the same basic connection as in FIG. 1 is illustrated; the add and drop devices in the right modules 23r are transposed as compared to the left modules 23l. As a result, a cross coupling exists between the group of left modules 23l and the group of right modules 23r and between the right group of modules 23r and the right monitor module 31r.

Figure 6:
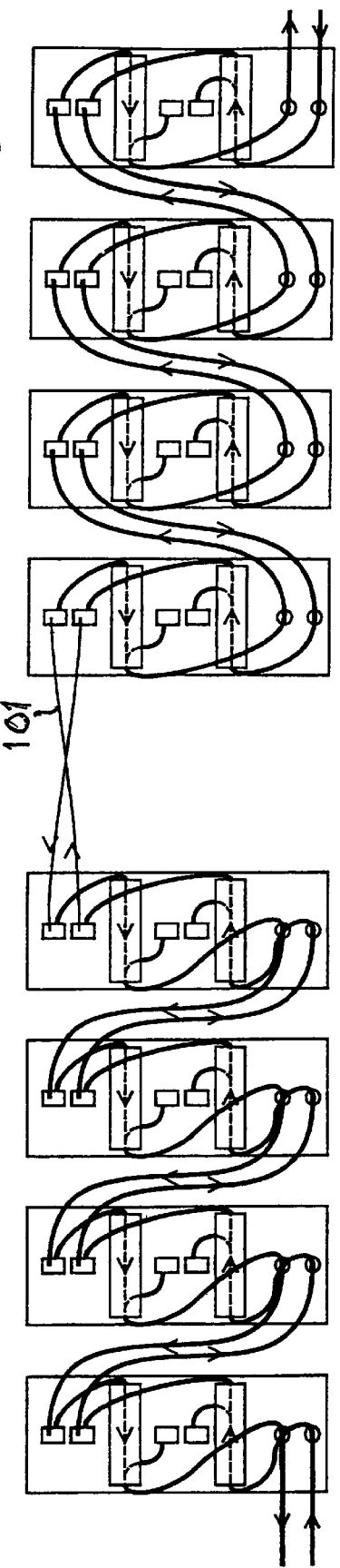
FIG. 6 is a diagram of the connections of the add/drop modules using loosely extending fiber within the add/drop nodes, according to an embodiment of the present invention.
Figure 7:
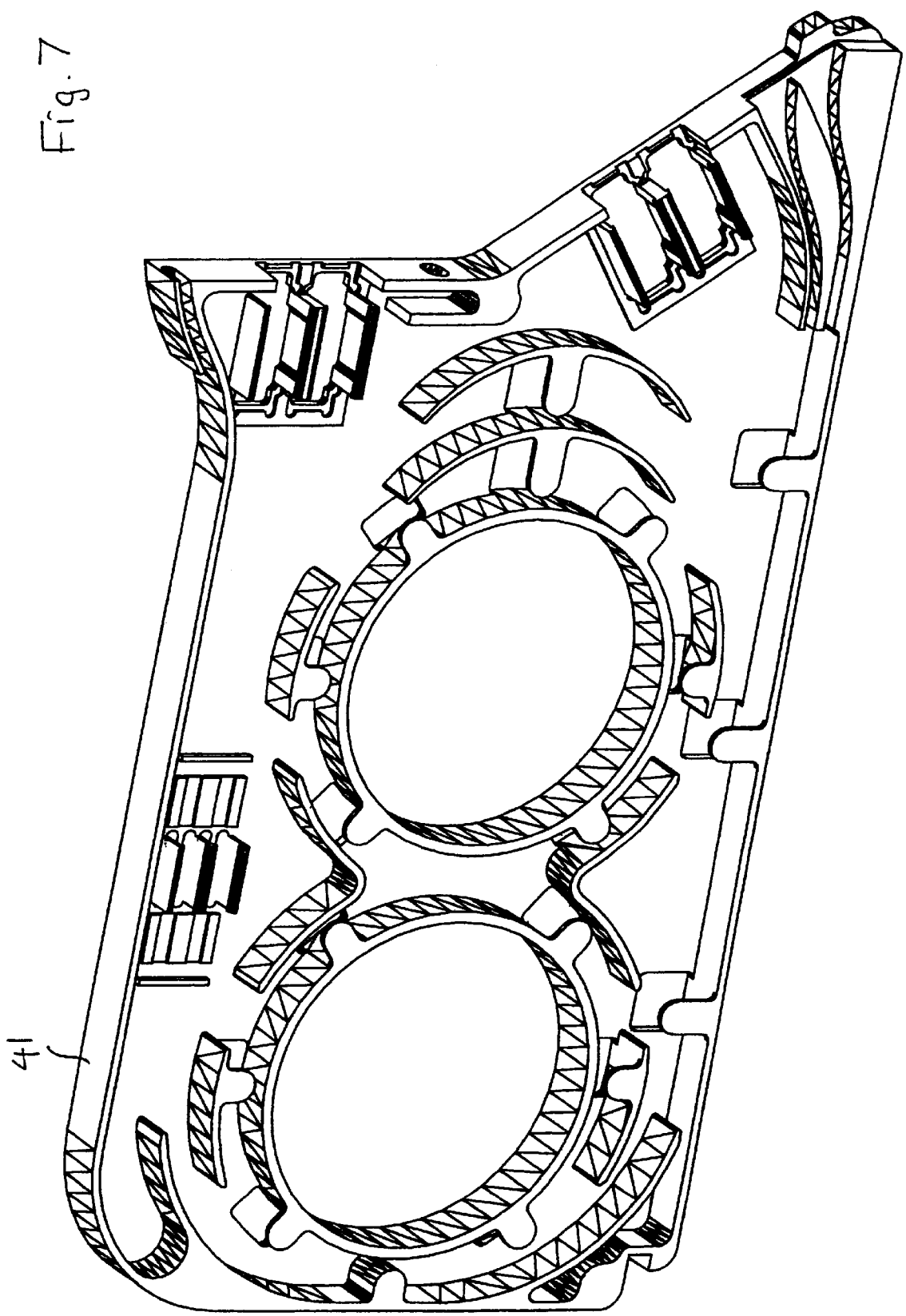
FIG. 7 is a perspective view showing the inside of the housing of an add/drop module according to an embodiment of the present invention.

The same connection of the modules is illustrated in FIG. 6, in which the connections between the add/drop modules via loosely extending fiber pieces are shown. From FIG. 6, it is clear that all add/drop modules can have an identical construction; only the tapping-off devices and filters are tailored to the channel for which the respective module is designed. The cross coupling resides in the middle of the assembly of add/drop modules, between the left and right modules. This cross connection can be made by connecting the loose fiber pieces 10l with optical connectors at each end in a cross configuration; alternatively, a particular cross connecting module can be used for the cross connection. Such a cross connecting module may have the same exterior shape as the other modules.

In FIG. 4, a multitude of add/drop modules 23i, 23r are illustrated. However, only a portion of the add/drop modules 23i, 23r may be required for a particular network architecture. Consequently, dummy modules with the same exterior layout but without the connectors and the loosely extending fibers are inserted. The dummy modules serve as place holders for expansion.

The two monitor modules 31l, 31r have the same exterior connectors as well as interior devices. However, the interior connections differ because of the orientation. The connections are shown in FIG. 1.

The client nodes 3 have a similar design to that of the hub node 2; however, the client nodes 3 are configured to receive and transmit in only one wavelength band. For example, the add/drop modules 23i, 23r, as described above, can be used in the client nodes 3. It is noted that in other network ring architectures, the client nodes 3 can be designed to receive and transmit in more than one wavelength band. In this case, the client nodes 3 will have the same structure as the hub node 2.

Obviously, numerous modifications and variations of the present invention are possible in light of the above teachings. It is therefore to be understood that within the scope of the appended claims, the invention may be practiced otherwise than as specifically described herein.

What is claimed is:

1. An add/drop node used in an optical network having two fiber paths for carrying light corresponding to a plurality of channels in opposite directions, comprising:
   a pair of add/drop modules corresponding to one of the plurality of channels, each of the add/drop modules comprising,
      an add device configured to add light to a first one of the fiber paths, and
      a drop device configured to deflect a portion of the light from a second one of the fiber paths,
      wherein the pair of add/drop modules have identical construction and said first and second fiber paths carry light in opposite directions;
   an optical client portion configured to interface with a client station to receive and transmit optical signals, the optical client portion comprising;
      a first optical receiver coupled to the client station to receive the optical signals;
      a first optical transmitter coupled to the first optical receiver and configured to transmit the received optical signals to one of the add/drop modules;
      a second optical receiver coupled to the one add/drop module; and
      a second optical transmitter coupled to the second optical receiver and configured to transmit optical signals to the client station.

2. The node according to claim 1, wherein the optical client portion comprises:
   a third optical receiver coupled to the other add/drop module; and
   a combiner configured to combine optical signals from the second optical receiver and the third optical receiver and to forward the combined optical signals to the second optical transmitter.

3. An optical communication system comprising:
   a plurality of fiber paths that carry optical signals corresponding to a plurality of channels in opposite directions; and
   a plurality of add/drop nodes coupled to the fiber paths, each of the add/drop nodes comprising,
      a pair of add/drop modules corresponding to one of the plurality of channels, each of the add/drop modules comprising,
         an add device configured to add light to one of the fiber paths, and
         a drop device configured to deflected a portion of the light from another one of the fibers paths, a client station coupled to one of the add/drop nodes, wherein the one add/drop node further comprises:
  an optical client portion configured to interface with the client station to receive and transmit optical signals, the optical client portion comprising,
    a first optical receiver coupled to the client station to receive the optical signals;
    a first optical transmitter coupled to the first optical receiver and configured to transmit the received optical signals to one of the add/drop modules;
    a second optical receiver coupled to the one add/drop module; and
    a second optical transmitter coupled to the second optical receiver and configured to transmit optical signals to the client station.

4. The system according to claim 3, wherein the optical client portion comprises:
  a third optical receiver coupled to the other add/drop module; and
  a combiner configured to combine optical signals from the second optical receiver and the third optical receiver and to forward the combined optical signals to the second optical transmitter.

5. An add/drop node used in an optical network having two fiber paths for carrying light corresponding to a plurality of channels in opposite directions, comprising:
  a pair of add/drop modules corresponding to one of the plurality of channels, each of the add/drop modules comprising,
    means for adding light to one of the fiber paths,
    means for deflecting a portion of the light from another one of the fibers paths, wherein the pair of add/drop modules have identical construction;
  means for interfacing with a client station to receive and transmit optical signals, the interfacing means comprising;
    a first optical receiver coupled to the client station to receive the optical signals:
    a first optical transmitter coupled to the first optical receiver for transmitting the received optical signals to one of the add/drop modules;
    a second optical receiver coupled to the one add/drop module; and
    a second optical transmitter coupled to the second optical receiver for transmitting optical signals to the client station.

6. The node according to claim 5, wherein the interfacing means comprises:
  a third optical receiver coupled to the other add/drop module; and
  means for combining optical signals from the second optical receiver and the third optical receiver and to forward the combined optical signals to the second optical transmitter.

* * * * *